June 5, 1956  C. W. GUMBERT ET AL  2,749,146
COUPLING WITH ROTARY SLIDING SEAL
Filed April 2, 1953  3 Sheets-Sheet 1
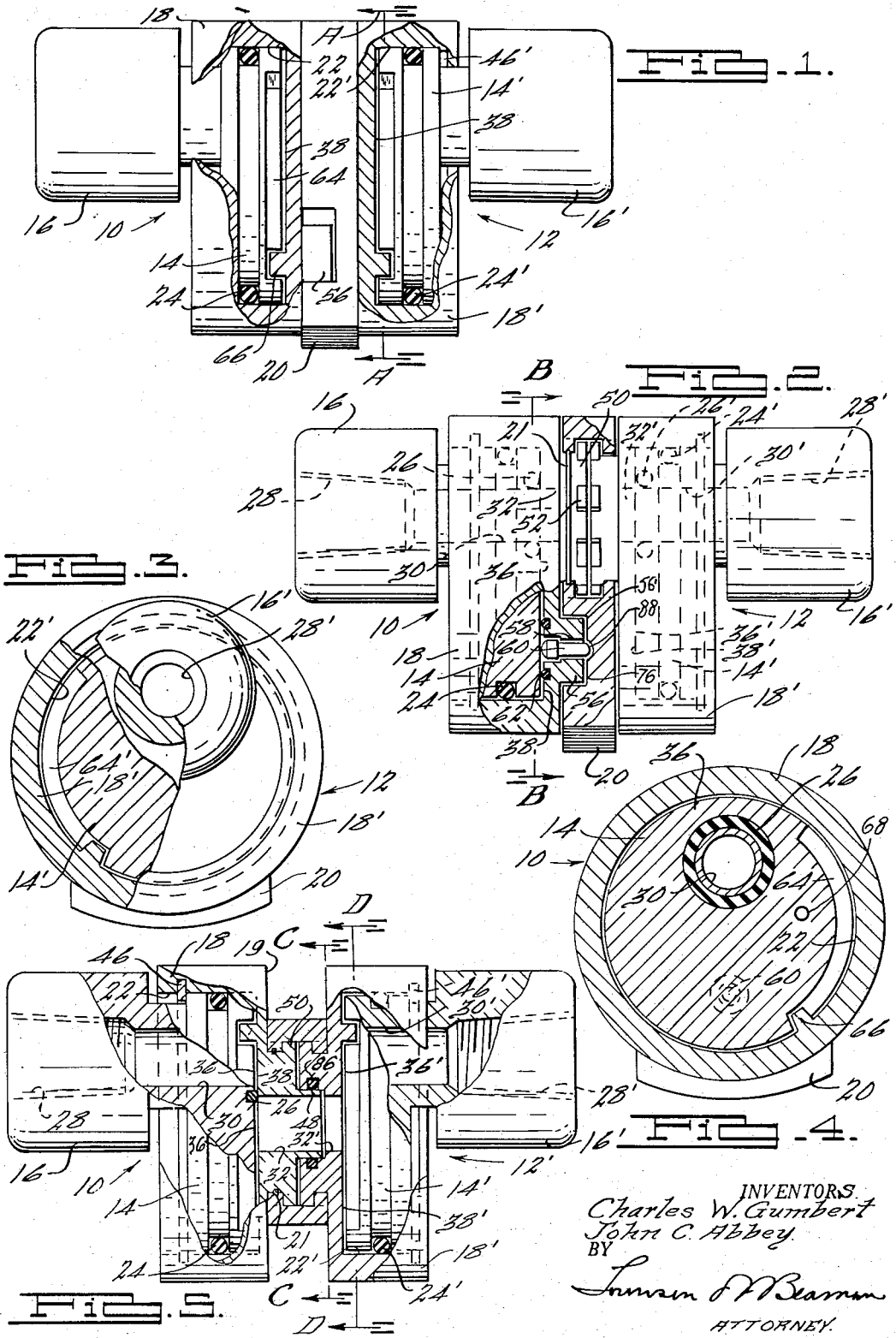
INVENTORS
Charles W. Gumbert
John C. Abbey
BY
Lawson & W. Beaman
ATTORNEY

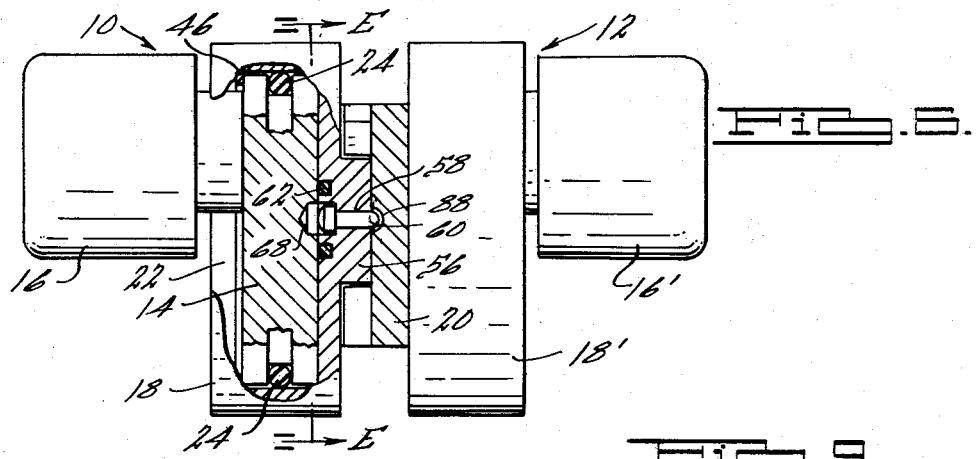

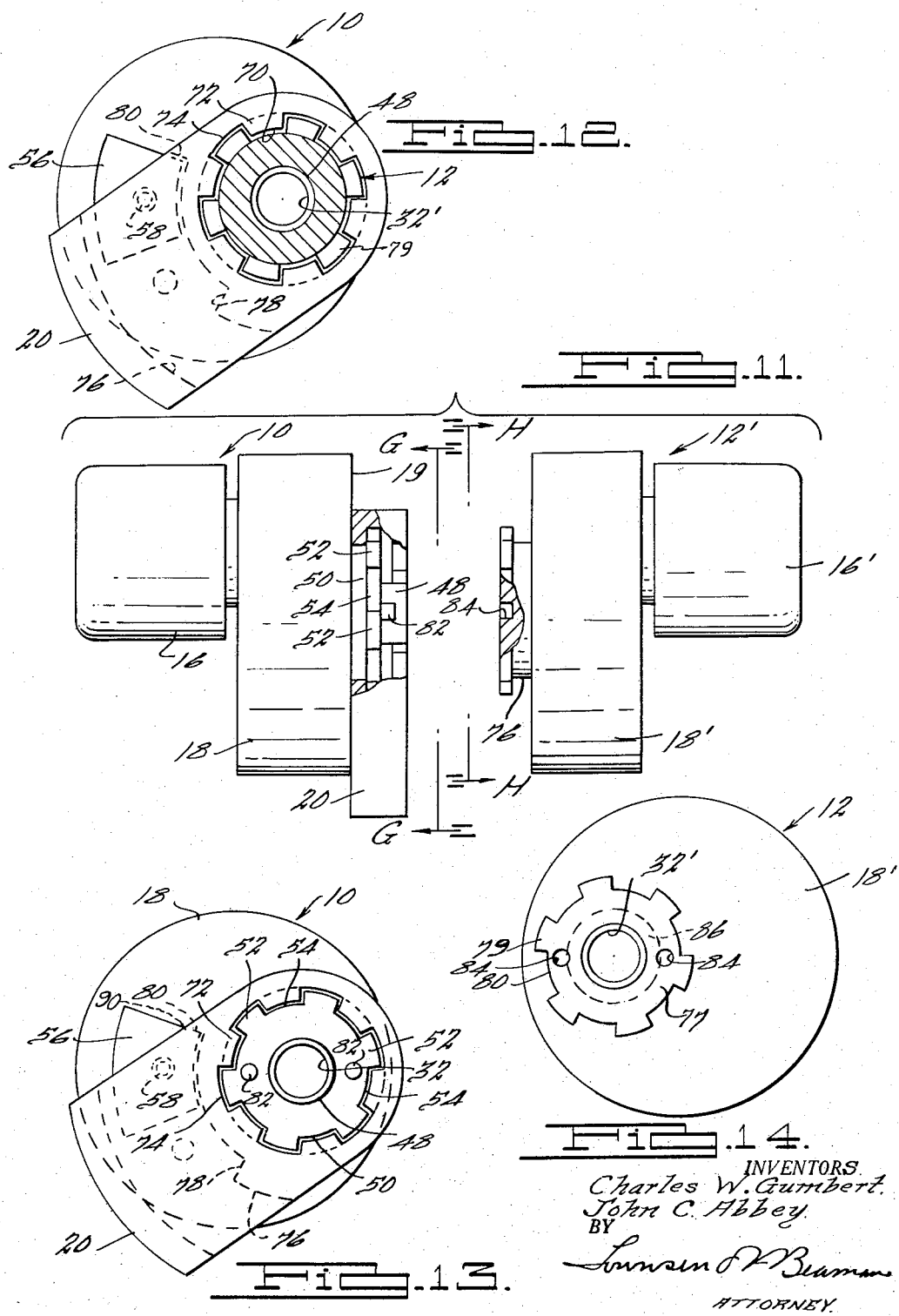

United States Patent Office 2,749,146
Patented June 5, 1956

2,749,146

COUPLING WITH ROTARY SLIDING SEAL

Charles W. Gumbert, Jackson, and John C. Abbey, Parma, Mich., assignors to Aeroquip Corporation, Jackson, Mich., a corporation of Michigan Application April 2, 1953, Serial No. 346,408

3 Claims. (Cl. 284—4)

This invention relates to improvements in couplings of the kind employed releasably to connect two fluid conductors, such as pipes or hose, in fluid flow relationship and which comprise a pair of hollow body parts with valve means, for sealing the same against escape of fluid upon disconnection, and means for releasably connecting the body parts together in fluid flow relationship.

Couplings of the above kind are known in which the connection and disconnection of the coupling body parts is effected by rotation of a connector sleeve, in the form of a union nut. In other known coupling constructions the inter-connection of the coupling body parts is effected with the use of sliding valve plates which are mounted for sliding movement upon the body parts in a plane transverse to the longitudinal axes of the body parts.

In all these known coupling constructions the connection and disconnection of the coupling body parts necessitates a relative movement of the parts and requires that space be provided in which to enable such movement to take place.

It frequently happens, however, that these couplings are required to be installed in crowded arrangements and under exceedingly limited space conditions. The problem arises, therefore, of providing a coupling construction in which the connection and disconnection of the body parts is capable of being effected with the requirement for the minimum of relative movement of the body parts.

It is an object of the present invention, therefore, to provide a coupling of the above kind having improved means for connecting and disconnecting the coupling body parts which enables this to be accomplished within the smallest possible compass or space.

Another object of the invention is to provide a coupling of the above kind in which the connection and disconnection of the coupling body parts is capable of being effected with a combined rotary and axial motion, with the extent of the axial motion being relatively small.

The above and further objects and advantages of the invention, residing in the construction, arrangement and combination of parts will appear clear from a consideration of the following description of one practical form of the invention, by way of example, and from the appended claims.

In the accompanying drawings,

Fig. 1 is a side elevational view of said form of the invention, partly in broken away section, showing the coupling body parts in connected position, in which rotary valve plates mounted upon the body parts are in open position, Fig. 2 is a similar view to Fig. 1 but with the broken away section showing the axial spline connection and rotary locking lever between the connected body parts, the locking being shown with its associated axial locking pin, Fig. 3 is a part cross-sectional elevation on the line A—A of Fig. 1, Fig. 4 is a section on the line B—B of Fig. 2, Fig. 5 is a similar view to Fig. 1 but with the coupling body parts rotated to the position in which the rotary valve plates are closed, Fig. 6 is a view similar to Fig. 5 but with the section showing the position of the locking pin when the rotary valve plates are moved to the closed position as seen in Fig. 5, Fig. 7 is a similar view of Fig. 6 but with the locking lever rotated to the position in which the coupling parts are free to be disconnected, Fig. 8 is a section on the line D—D of Fig. 5, Fig. 9 is a section on the line E—E of Fig. 6, Fig. 10 is a section on the line C—C of Fig. 5, Fig. 11 is an elevational view, partly in section, showing the two coupling body parts disconnected and positioned for connection, Fig. 12 is a section on the line F—F of Fig. 7, Fig. 13 is an end view looking in the direction of the arrows G—G in Fig. 11, and Fig. 14 is an end view looking in the direction of the arrows H—H in Fig. 11.

Referring to the drawings, 10 and 12 indicate, generally, two coupling body parts, each composed of a circular plate 14, 14' having an integral boss part 16, 16' and a cylindrical part 18, 18' in which the circular plates 14, 14" are rotatably mounted.

20 indicates, generally, an oscillatable locking lever or actuator retained upon the part 18 of the body part 10, by the action of a split retaining spring 21 (Figs. 2 and 5), for limited oscillatory motion as and for the purpose to be described later.

The cylindrical part 18 has a circular bore 22 in which the circular plate 14 is rotatably mounted in a fluid sealed manner by the action of the sealing rings 24 and 26, the sealing rings 26 being shown in Figs. 2, 4, 5 and 9.

The cylindrical part 18' is likewise formed with a circular bore 22' in which its companion circular plate 14' is rotatably mounted in a fluid sealed manner by the action of the sealing rings 24' and 26', the sealing ring 26' being shown in Figs. 2 and 8.

The boss 16 is eccentrically positioned upon the circular plate 14 and has a hollow bore 28, which bore is in communication with a bore 30 which extends through the circular plate 14. The bores 28 and 30 form, in effect, an axially aligned common bore eccentric to the circular plate 14.

The boss 16' and circular plate 14' likewise have axially aligned common bores 28' and 30', respectively, eccentric to the plate 14'.

The sealing rings 24 and 24' are shown mounted in annular grooves in the outer periphery of the circular plates 14 and 14', and seal with respect to the bores 22 and 22' of their respective cylindrical parts 18 and 18'.

The boss parts 16 and 16' are adapted for connection with relatively fixed fluid conductors, such as to the ends of flexible hose (not shown) so that, in use, the boss parts 16 and 16', and their associated circular plates 14 and 14', will normally be held against rotary movement but will permit their outer cylindrical parts 18 and 18' to be rotated relatively thereto.

The cylindrical part 18 has an eccentric bore 32 capable of being brought into register with the bore 30 and the cylindrical part 18' also has an eccentric bore 32' capable of being brought into register with the bore 30' such that, in the fully connected condition of the coupling parts 10 and 12, as seen in Fig. 2, the bores 28, 30, 32, 32' 30' and 28' are in axial alignment and provide a common composite duct for the flow of fluid through the coupling parts.

The sealing ring 26 is mounted in an annular recess in the face 36 of the circular plate 14 and in encircling concentric relationship to the bore 30. This sealing ring 26, therefore, besides sealing against the face 38 of the cylindrical part 18 is also located within the circular confines of the sealing ring 24.

Likewise, the sealing ring 26' is mounted in an annular recess in the face 36' of its circular plate part 14' in encircling relationship to the bore 30' and seals against the face 38' of the cylindrical part 18', with the sealing ring 26' located eccentrically within the confines of the sealing ring 24'.

The cylindrical parts 18 and 18' are shown retained for relatively rotary motion upon their respective circular plate parts 14 and 14' by means of the snap rings 46, 46'.

The bore 32 of the cylindrical part 18 is contained in a boss 48 which projects axially from the outer surface 19 of the part 18 and forms an inner collar portion 50 which is formed around its peripheral edge with similar axial splines 52 defining similar arcuate slots 54 between them.

In diametral opposition to the boss 48 the said cylindrical part 18 is also formed with an arcuate lug 56 having a central axial hole 58 in which a pin 60 is mounted for axial sliding movement, this pin being longer than the hole 58 and being projectable at one end either from the outer surface 56' of the lug 56 or from the interior surface 38 of the end wall of body part 18 carrying said boss 48 and lug 56. On said interior surface 38, there is an annular sealing ring 62 sealing against the part 14 with respect to the hole 58. The part 14 is formed with an arcuate recess 64 (Figs. 3, 4 and 9) in which a projection 66 on the cylindrical body part 18 engages to limit the relative rotation between the parts 14 and 18. The part 14 is also formed with a recess 68 capable of registering with the pin 60 at the end of one limit of relative movement of the arcuate recess 64 with respect to the projection 66.

The locking lever or actuator 20 is formed with a bore 70 which has a central groove 70' between flanges 70" each having axially aligned and alternately arranged splines 72 and recesses 74 corresponding to the splines 52 and recesses 54 and by which the lever 20 is inserted by lateral movement upon the part 18 with the collar 50 disposed in the groove 70'; the lever 20 having an arcuate recess 76 in which the arcuate lug 56 engages. Shoulders 78 on one side of the arcuate recess 76 serve, by engagement with opposite ends of the lug 56 to limit the angular travel of the lever 20. Also received in groove 70' is an axially splined and recessed collar 77 on the other cylindrical body part 18'. This collar 77 is shown with the axial splines 79 and alternate axial recesses 80 corresponding to the splines 52 and recesses 54 of the collar 50. With the splined collars 50 and 77 disposed within the groove 70' the lever or actuator 20 may be oscillated back and forth relative to the parts 18 and 18' within the limits of movement of the lug 56 relative to the shoulder 78 of the recess 76.

Diametral pins 82 on the boss part 48 are engageable in diametral holes 84 in the collar part 77 to prevent relative rotation between the parts 18 and 18' in the connected condition of the coupling parts.

The collar 77 carries a sealing ring 86 (Figs. 5 and 14) for sealing about the boss 48 in the connected condition of the coupling body parts.

With the coupling parts 10 and 12 connected and in the "open" position of Figs. 1 and 2, the pin 60 is in the position engaging with the depression 88 in the actuator or lever 20 to lock the lever 20 against movement relative to the parts 18 and 18'. Thus, in the "open" position the parts 10 and 12 cannot be disconnected from each other as the lever 20 cannot be shifted relative to the parts 18 and 18' and the splines 52 and 79 are in opposed relation to the splines 72.

Assuming the parts 16 and 16' to be connected to fixed fluid conductors, the plates 14 and 14' will be positioned in fixed relationship to each other. At the same time the parts 18 and 18' will be locked against rotation relative to each other through the engagement of the pins 82 on the boss part 48 of the part 18 with the holes 84 on the collar part 77 of the part 18'.

With the component parts of the coupling in the position just described in the last two paragraphs, to "close" the parts 10 and 12, the parts 18, 18' and 20 are rotated as a unit about the axis of the bores 30, 30' to dispose the bores 32, 32' to one side of said axis as shown in Fig. 5 to close the bores 30, 31 against the flow of fluid. Thus, the coupling functions in this position as a shut off valve. This unitary movement of the parts 18, 18' and 20 (into the position of Fig. 5) relative to the plates 14, 14' may be continued until pin 60 is aligned with the recess 68, as shown in Fig. 6. With the parts 14, 14' and 18, 18' so aligned the actuator or lever 20 may then be rotated relative to the parts 18, 18' as the pin 60 may be shifted into the position shown in Fig. 7. Such relative movement between the lever 20 and the parts 18, 18' will shift the splines 52 and 79 out of opposed relation with the splines 72 and the coupling parts 10 and 12 may be separated axially, the splines 52 and 79 upon separation passing out through the recesses 74. The shifting of the lever 20 relative to the part 18 is limited by engagement of the shoulder 78 with the lug 56 in one direction and the engagement of the lug 56 with the shoulder 90 at the end of the arcuate recess 76.

When the lug 56 engages the shoulder 90, as shown in Figs. 12 and 13, the splines 52 and 79 are axially aligned with the recesses 74. With the lug 56 engaging the shoulder 78 the splines 52 and 79 will be in axially opposed alignment with the splines 72.

Having thus disclosed our invention, what we claim as novel and wish to secure by Letters Patent is as follows:

1. A coupling comprising a pair of coupling parts each having an inner annular plate with an end face and a fluid opening defined in said face and a fluid connector having a bore aligned with said opening and projecting from the opposite side of said face, an annular outer member embraced by each of said plates and rotatably supported thereon, each of said outer members having an end face thereof contiguous with the said end face of each of said annular plates and having an opening defined therein, the openings defined in said faces being eccentrically arranged with respect to the axis of rotation of said outer members on said plates but registering with the openings of said plates in one position of relative rotation, opposed portions of said outer members having axial and radially extending portions, an actuator disposed between said outer members with said parts coupled and embracing said radial projecting portions of said outer members and rotatably supported thereon, said actuator having abutment structure axially displaced with reference to said radially projecting portions with said parts coupled and adapted to be displaced upon relative rotation of one extent into axial opposed relation to said radially projecting portions to couple said outer members together and against axial separation while permitting axial separation of said outer members and said parts upon relative rotation of said actuator of another extent taking said abutment structure out of axial opposed relation with said radially projecting portions, an opening defined in said actuator in axial alignment with said openings in said outer members, means upon said outer members to lock the same together for unitary rotary movement with said parts coupled, means locking said actuator to said parts and against relative rotation with said openings in register with said parts coupled, said outer members and said actuator being rotatable as a unit about the axis of rotation of said plates into a closed position to shift said openings out of register to close said openings of said inner plates to fluid flow by said contiguous faces of said outer members, means upon said contiguous faces for shifting said locking means to render the same inoperative upon relative rotation between said faces to release said actuator for rotation relative to said outer members with the same in said closed position to permit axial separation of said coupling parts.

2. In a fluid coupling, a pair of coupling body parts, each said part comprising an outer cylindrical part with a fluid flow opening and an inner circular plate part with a fluid flow opening, means mounting said outer cylindrical part and its corresponding circular plate part for relative rotation to position said openings in or out of register, axially inter-engageable means on said cylindrical parts for inter-connecting said body parts with said openings closed, actuator means rotatably mounted on one said body part for rotation to place said openings in register, means locking said coupling parts against disconnection when said openings are in register, said axially inter-engageable means comprising circular assemblies of splines and recesses extending from opposed end surfaces of the two cylindrical body parts, said assemblies being axially aligned in the connected position of the body parts, said surfaces containing said fluid flow openings in said body parts, said rotatable actuator means comprising a lever having an opening in one end presenting an internal circular assembly of axial splines and recesses corresponding to said first mentioned axial splines and recesses but having a central groove of an axial extent sufficient to receive said axially aligned splines and recesses of said body parts, said lever opening presenting end splines on opposite sides of said groove for locking behind the splines on said body parts, upon relative rotation of said lever, for preventing axial separation of said body parts.

3. In a fluid coupling, a pair of coupling body parts, each said part comprising an outer cylindrical part with a fluid flow opening and an inner circular plate part with a fluid flow opening, means mounting said outer cylindrical part and its corresponding circular plate part for relative rotation to position said openings in or out of register, sealing rings on said body parts sealing about said openings, axially inter-engageable means on said cylindrical parts for inter-connecting said body parts with said openings closed, and actuator means rotatably mounted on one said body part for rotation to place said openings in register, said actuator means including means locking said coupling parts against disconnection until said openings have been moved out of register, said axially inter-engageable means comprising a circular assembly of splines and recesses extending axially from an end surface of one said cylindrical body part and a similar assembly of splines and recesses extending axially from an end surface of the other cylindrical body part, said end surfaces containing said fluid flow openings in said body parts, said rotatable actuator means comprising a lever having an opening in one end presenting an internal circular assembly of axial splines and recesses corresponding to said first mentioned axial splines and recesses but of an axial extent sufficient to include both said splines and recesses on said end surfaces when positioned in axial alignment with said end surfaces being in opposed location for connection of the body parts, said lever opening presenting end splines for locking behind the aligned splines on said body parts, upon relative rotation of said lever, for preventing axial separation of said body parts.

References Cited in the file of this patent

UNITED STATES PATENTS

| 2,317,827 | Townhill | Apr. 27, 1943 |
| 2,399,525 | Waag | Apr. 30, 1946 |
| 2,436,327 | Pommer | Feb. 17, 1948 |

FOREIGN PATENTS

| 123,359 | Great Britain | Feb. 17, 1919 |
| 295,130 | Germany | Nov. 10, 1916 |